United States Patent
Crowe et al.

(10) Patent No.: US 10,701,202 B2
(45) Date of Patent: Jun. 30, 2020

(54) CONTROL OF NOTIFICATIONS ON A MOBILE COMMUNICATION DEVICE BASED ON DRIVING CONDITIONS

(71) Applicant: Lenovo Enterprise Solutions (Singapore) Pte. Ltd., Singapore (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 14/937,003

(22) Filed: Nov. 10, 2015

(65) Prior Publication Data

US 2017/0134565 A1   May 11, 2017

(51) Int. Cl.
*H04W 24/00* (2009.01)
*H04M 1/725* (2006.01)
(Continued)

(52) U.S. Cl.
CPC ....... *H04M 1/72577* (2013.01); *H04W 4/027* (2013.01); *H04W 4/44* (2018.02)

(58) Field of Classification Search
CPC .. H04M 1/72577; H04M 1/725; G06Q 40/08; G07C 5/008; G08G 1/27;
(Continued)

(56) References Cited

U.S. PATENT DOCUMENTS 8,284,037 B2 * 10/2012 Rennie .................. G08G 1/017
                                                          340/426.16
8,538,785 B2 *  9/2013 Coleman ............... G06Q 40/08
                                                          705/4
(Continued)

FOREIGN PATENT DOCUMENTS

WO   WO-2009000743 A1 * 12/2008 ....... B60R 21/01516
WO   WO-2012028883 A1 *  3/2012 ............. G09B 9/042

OTHER PUBLICATIONS

Particle and trace gas emission factors under urban driving conditions in Copenhagen based on street and roof-level observations, Matthias Ketzel, Peter Wahlin, Ruwim Berkowicza, Finn Palmgrena; Atmospheric Environment, vol. 37, Issue 20, 2003, pp. 2735-2749, ISSN 1352-2310, https://doi.org/10.1016/S1352-2310(03)00245-0.*

(Continued)

*Primary Examiner* — Mahendra R Patel
(74) *Attorney, Agent, or Firm* — Jeffrey Streets (57) ABSTRACT

One method includes identifying driving conditions associated with a current location of a mobile communication device, receiving a notification to be output on the device, preventing the device from outputting the notification in response to identifying a first driving condition, and outputting the notification on the device in response to identifying a second driving condition. A second method includes identifying one or more driving conditions associated with a current location of a mobile communication device and calculating a driving hazard score as a function of the identified one or more driving conditions. The second method further includes receiving a notification to be output on the device, preventing the device from outputting the notification in response to the driving hazard score exceeding a first threshold value, and outputting the notification on (Continued)

the device in response to the driving hazard score being less than a second threshold value.

19 Claims, 5 Drawing Sheets

(51) Int. Cl.
*H04W 4/44* (2018.01)
*H04W 4/02* (2018.01)

(58) Field of Classification Search
CPC .. G08G 1/096775; A61H 3/061; A61H 3/008; H04W 4/44; H04W 4/027; H04W 4/04; H04W 68/00
USPC ............. 455/456.4, 455.517, 456.3; 701/301
See application file for complete search history.

(56) References Cited

U.S. PATENT DOCUMENTS

| | | | | |
|---|---|---|---|---|
| 8,583,333 B2* | 11/2013 | Rennie | ................... | G06Q 10/06 701/50 |
| 9,842,496 B1* | 12/2017 | Hayward | ............. | G08G 1/0125 |
| 2004/0088095 A1* | 5/2004 | Eberle | ............... | B60R 21/01512 701/45 |
| 2005/0030184 A1* | 2/2005 | Victor | ................... | B60K 28/06 340/576 |
| 2005/0080565 A1* | 4/2005 | Olney | ................ | B60K 31/0008 701/301 |
| 2011/0021234 A1* | 1/2011 | Tibbitts | ................. | H04W 48/04 455/517 |
| 2011/0077028 A1* | 3/2011 | Wilkes, III | ............ | B60W 50/14 455/456.3 |
| 2011/0307188 A1* | 12/2011 | Peng | ....................... | G06Q 40/08 702/33 |
| 2012/0123806 A1* | 5/2012 | Schumann, Jr. | ............................. | G08G 1/096775 705/4 |
| 2013/0046510 A1* | 2/2013 | Bowne | ............... | G06Q 10/0639 702/187 |
| 2013/0127614 A1* | 5/2013 | Velusamy | ............. | H04W 76/10 340/539.11 |
| 2015/0292898 A1* | 10/2015 | Aldereguia | ........ | G01C 21/3469 701/410 |
| 2016/0086285 A1* | 3/2016 | Jordan Peters | ........ | G06Q 40/08 705/4 |
| 2019/0111984 A2* | 4/2019 | Bean | ................... | H04L 12/4625 |

OTHER PUBLICATIONS

Philip P; Sagaspe P; Taillard J et al. Fatigue, sleepiness, and performance in simulated versus real driving conditions. SLEEP 2005;28(12): 1511-1516, https://academic.oup.com/sleep/article-abstract/28/12/1511/2707972.*

Han, Haofu & Yu, Jiadi & Zhu, Hongzi & Chen, Yingying & Yang, Jie & Zhu, Yanmin & Xue, Guangtao & Li, Minglu. (2014). SenSpeed: Sensing Driving Conditions to Estimate Vehicle Speed in Urban Environments. IEEE Transactions on Mobile Computing. 15. 727-735. 10.1109/INFOCOM.2014.6847999. https://www.cse.buffalo.edu/~lusu/cse726/papers/SenSpeed%20Sensi.*

Sarah Kraus, "Safety Driving School", Global News, defensivedriving.com/Online, Feb. 22, 2015, 3 pages.

* cited by examiner

CONTROL OF NOTIFICATIONS ON A MOBILE COMMUNICATION DEVICE BASED ON DRIVING CONDITIONS

BACKGROUND

Field of the Invention

The present invention relates to methods of limiting the use of a mobile communication device while driving a vehicle.

Background of the Related Art

A modern mobile communication device may provide many useful capabilities and may be small enough to accompany a person anywhere they go. As a result, most people have their own personal mobile communication device with them at all times. Applications installed on a mobile communication device may be tailored to implement a music player, web browser, social media interface, phone calls, video calls, email messaging and text messaging. Many other applications and functions are already available and even more are expected to be made available over time.

However, using a mobile communication device while driving can be dangerous and has resulted in a rise in the number of vehicle accidents caused by distracted driving. Many organizations have advised against activities that can distract a driver, but the danger has not been eliminated.

There have been a variety of attempts to prevent use of a mobile communication device while driving. Certainly, the mobile communication device may be turned off before driving, but people who use their device frequently will find this to be impractical. A more practical approach includes installing an application that locks the phone entirely if the mobile communication device is in use while in a moving vehicle. Another application has been developed that will send an email notification to a third party, such as a family member of a user, if the user's mobile communication device is in use while in a moving vehicle as determined by a GPS signal. A further application, when enabled, uses GPS to determine speed and automatically silences incoming text message alerts when moving at 15 miles per hour (MPH) or more.

BRIEF SUMMARY

One embodiment of the present invention provides a method comprising identifying one or more driving conditions along a roadway associated with a current location of a mobile communication device, receiving a notification to be output on the mobile communication device, preventing the mobile communication device from outputting the notification in response to identifying a first driving condition, and outputting the notification on the mobile communication device in response to identifying a second driving condition.

Another embodiment of the present invention provides a method comprising identifying one or more driving conditions along a roadway associated with a current location of a mobile communication device and calculating a driving hazard score as a function of the identified one or more driving conditions. The method further comprises receiving a notification to be output on the mobile communication device, preventing the mobile communication device from outputting the notification on the mobile communication device in response to the driving hazard score exceeding a first threshold value, and outputting the notification on the mobile communication device in response to the driving hazard score being less than a second threshold value.

DETAILED DESCRIPTION

One embodiment of the present invention provides a method comprising identifying one or more driving conditions along a roadway associated with a current location of a mobile communication device, receiving a notification to be output on the mobile communication device, preventing the mobile communication device from outputting the notification in response to identifying a first driving condition, and outputting the notification on the mobile communication device in response to identifying a second driving condition. In one option, the current location of the mobile communication device is determined using signals from a global positioning system. In another option, the notification provides notice of an event selected from an incoming call, an incoming text message, an incoming email, an application state change, a weather alert, and a timer expiration.

The method may further comprise storing a list of hazardous driving conditions including the first driving condition, wherein preventing the mobile communication device from outputting the notification in response to identifying a first driving condition includes preventing the mobile communication device from outputting the notification in response to identifying any driving condition on the list of hazardous driving conditions, and wherein outputting the notification on the mobile communication device in response to identifying a second driving condition includes outputting the notification on the mobile communication device in response to determining that none of the one or more driving conditions are on the list of hazardous driving conditions.

Where the notification is related to an incoming message from a sender, the method may sending an automatic reply message to the sender indicating that notifications have been temporarily blocked. The automatic reply message may also include a specific statement of the conditions causing the notifications to be blocked and/or an estimate of when the notifications may be output to the user. In a further option, the method may include receiving a notification having a high importance flag, and outputting the notification having the high importance flag regardless of whether the driving hazard score exceeds the first threshold value.

One or more driving conditions along a roadway associated with a current location of a mobile communication device may, in one example, be identified by accessing map data for a roadway that includes the identified current location of the mobile communication device. Such map data may be stored in a data storage device within or associated with the mobile communication device, or stored by a third party server accessible over the wireless data network.

The map data may identify one or more predetermined driving conditions and/or one or more variable driving conditions associated with the roadway. For example, the map data may include one or more predetermined driving conditions selected from a speed limit, a construction zone, merging lanes, roadway curves, roadway straight-ways, stop lights, stop signs, and accident history. These are aspects of the roadway that don't change frequently. Furthermore, the map data may include one or more variable driving conditions associated with the roadway, wherein the one or more variable driving conditions is selected from road hazards and traffic conditions. These variable driving conditions are expected to change frequently, such as reflecting a traffic accident that has not yet cleared or the morning and evening rush hour traffic. It is possible that the driving conditions may be accessed from different sources, such as the predetermined driving conditions being accessed from a map service and the variable driving conditions being accessed from a local metro traffic authority.

Another embodiment of the present invention provides a method comprising identifying one or more driving conditions along a roadway associated with a current location of a mobile communication device and calculating a driving hazard score as a function of the identified one or more driving conditions. The method further comprises receiving a notification to be output on the mobile communication device, preventing the mobile communication device from outputting the notification on the mobile communication device in response to the driving hazard score exceeding a first threshold value, and outputting the notification on the mobile communication device in response to the driving hazard score being less than a second threshold value.

The mobile communication device may take various forms including, without limitation, a mobile smartphone, tablet or notebook computer, or an on-board computer system integrated into a vehicle. Furthermore, the various tasks described as being performed by a mobile communication device may be performed by multiple mobile communication devices performing different parts of the method. For example, a mobile smartphone may wirelessly link with the on-board computer system of a vehicle in order to utilize the vehicle's display, speaker or microphone.

The current location of the mobile communication device may be determined using signals from a global positioning system (GPS). This is a common feature of modern smartphones and on-board computers enabled with a navigation program. However, the current location of the mobile communication device might be determined using other techniques, including identification of a cell tower where the mobile communication device is currently making a wireless connection or even camera images using object recognition or character recognition to cross-reference with map data.

The current location of the mobile communication device may be updated periodically, preferably frequently or nearly continuously. When the current location has been updated, the method may repeat the steps of identifying one or more driving conditions along a roadway associated with the current location of the mobile communication device, and calculating a driving hazard score as a function of the identified one or more driving conditions. In order to avoid a large volume of unnecessary calculations, an update frequency based on time or distance traveled may be established. For example, the steps of identifying one or more driving conditions and calculating a driving hazard score may be repeated only after expiration of a timer or traveling a threshold distance.

One or more driving conditions along a roadway associated with a current location of a mobile communication device may, in one example, be identified by accessing map data for a roadway that includes the identified current location of the mobile communication device. Such map data may be stored in a data storage device within or associated with the mobile communication device, or stored by a third party server accessible over the wireless data network.

In a further embodiment of the present invention, each of the identified one or more driving conditions may be associated with a number of driving hazard points. For example, a stop light may be assigned 5 points, a narrow bridge may be assigned 8 points, and sharp curve may be assigned 10 points. Other driving conditions and their assigned number of driving hazard points may be stored in searchable a data structure, such as a table. Optionally, the driving hazard score may be calculated as a function of the number of driving hazard points associated with each of the identified one or more driving conditions over a selected distance or section of the roadway. Continuing with the previous example, assume that user settings indicate that the "current driving conditions" are those driving conditions that the map data associates with a "sliding" one mile section of a roadway directionally ahead of the current location of the mobile communication device. Assuming that a first one mile section of the roadway includes two stop lights (2×5 points=10 points), a narrow bridge (8 points), and a sharp curve (10 points), the current driving hazard score would be 28. If the first threshold value was 25, then the current driving hazard score is greater than the first threshold value such that any notification will be temporarily blocked. After traveling the distance of the first one mile section, if the next one mile section has a driving hazard score of 8 and the second threshold value is 10, then a previously received notification would be output.

Embodiments of the method include receiving a notification to be output on the mobile communication device. A notification can be generated internally by an application being executed by the mobile communication device, perhaps in accordance with user settings or preferences, or can originate externally by another mobile communication device or third party service. Typically, receiving a notification will result in a screen displaying pop-up or balloon including a message or icon, a speaker producing an audible sound, or the mobile communication device vibrating. These actions are intended to draw a user's attention to the notification. For example, a notification may provide notice of an event selected from an incoming call, an incoming text message, an incoming email, an application state change, a weather alert, and a timer expiration.

Embodiments of the present invention prevent the mobile communication device from outputting the notification on the mobile communication device in response to the driving hazard score exceeding a first threshold value. Preferably, a received notification is not deleted, but is simply not output to the user when the user's attention should be directed to driving under the identified driving conditions. The notification may be queued for output at a later point. Embodiments of the present invention further include outputting the notification on the mobile communication device in response to the driving hazard score being less than a second threshold value. For example, if a notification is received during a period that the driving hazard score exceeds the first threshold, then output of the notification may be delayed until the driving hazard score is less than the second threshold value. The first and second threshold values may be the same, but the values may also be different, such as the first threshold value being greater than the second threshold value. In one option, when the driving hazard score exceeds the first threshold value, a message may be output on the mobile communication device indicating to the user that notifications are currently being prevented. Similarly, where the notification is related to an incoming message from a sender, the method may send an automatic reply message to the sender indicating that notifications have been temporarily blocked. The automatic reply message may also include a specific statement of the conditions causing the notifications to be blocked and/or an estimate of when the notifications may be output to the user. In a further option, the method may include receiving a notification having a high importance flag, and outputting the notification having the high importance flag regardless of whether the driving hazard score exceeds the first threshold value.

In another embodiment, the method may further include identifying a driving experience level associated with the user of the mobile communication device and selecting the first threshold value as a function of the identified driving experience level. Such driving experience level may be manually entered, derived from a user profile or questionnaire, or measured according to driving metrics such as staying centered within a driving lane or controlled stopping at a stop light. In one option, the driving experience level is positively correlated to the number of times that the mobile communication device has been at the current location of the identified roadway. A history may be stored in association with the mobile communication device, which may indicate how frequently and/or recently the user drives along the identified roadway. Presumably, frequent and/or recent use of the roadway will make the user aware of the driving conditions such that less attention is necessary.

Further embodiments may automatically select an output device of the mobile communication device based on the driving hazard score, wherein the notification is output on the selected output device. Typical output devices include a display screen, a speaker, and a vibrator. In fact, where the mobile communication device is a smartphone, the smartphone may be connected to additional display screens, speakers and the like via a short range wireless standard, such as Bluetooth®. Accordingly, the selection of an output device may include selection of the type of output device as well as selection of a particular output device of the selected type. For example, a notification posted on a heads-up display may be read without the user looking down or to the side, and taking any action on the notification would presumably be limited to a voice command. In one option, automatically selecting an output device of the mobile communication device based on the driving hazard score includes automatically selecting a speaker as the output device in response to the driving hazard score exceeding the first threshold value.

In yet another embodiment, the method may identify a planned route of the mobile communication device, calculate a driving hazard score as a function of the identified one or more driving conditions at multiple points along the planned route, estimating a period of time or a distance of travel after which notifications will no longer be prevented, and output the estimated period of time or distance of travel. Accordingly, it is possible to notify a user that one or more notifications have been received, without actually providing the notifications themselves, and further notifying the user of when the notifications may be made available. Optionally, outputting the estimated period of time or distance of travel includes displaying a map indicating at least a portion of a roadway where notifications will be prevented.

Another embodiment of the present invention provides a computer program product comprising a non-transitory computer readable storage medium storing program instructions that are executable by a processor to cause the processor to perform a method. The method may comprise identifying one or more driving conditions along a roadway associated with a current location of a mobile communication device and calculating a driving hazard score as a function of the identified one or more driving conditions. The method further comprises receiving a notification to be output on the mobile communication device, preventing the mobile communication device from outputting the notification on the mobile communication device in response to the driving hazard score exceeding a first threshold value, and outputting the notification on the mobile communication device in response to the driving hazard score being less than a second threshold value.

The foregoing computer program products may further include computer readable program code for implementing or initiating any one or more aspects of the methods described herein. Accordingly, a separate description of the methods will not be duplicated in the context of a computer program product.

Figure 1:
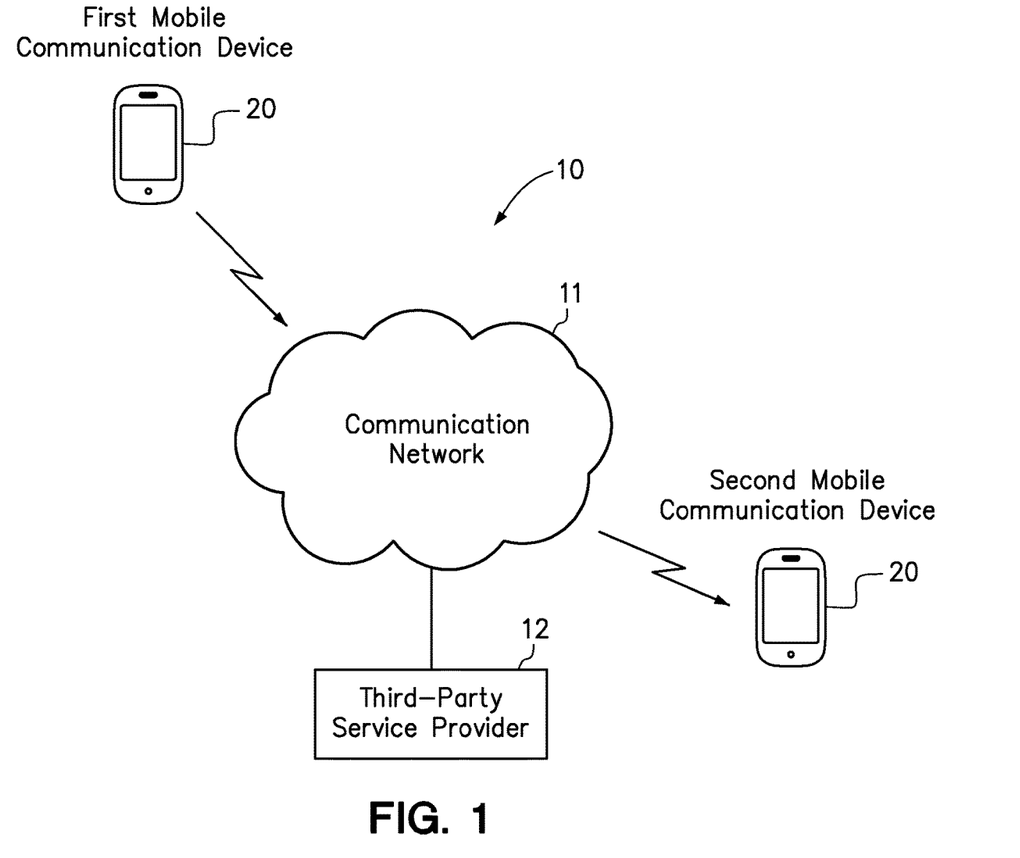
FIG. 1 is a diagram of a system in which embodiments of the present invention may be performed.

FIG. 1 is a diagram of a system 10 including a first mobile computing device 20 and a second mobile computing device 20 in communication over a communication network 11. The first and second mobile communication devices 20 may or may not be identical. In one example, the first mobile communication device may initiate a call or send a text message to the second mobile communication device. In accordance with certain embodiments, a third-party service provider 12 may also be in communication with the computing devices 20 over the network 11. For example, the third-party service provider 12 may, without limitation, a map service providing access to roadway data and certain driving conditions related to those roadways, or a local metro traffic authority providing driving conditions such as current traffic, hazard and construction data.

Figure 2:
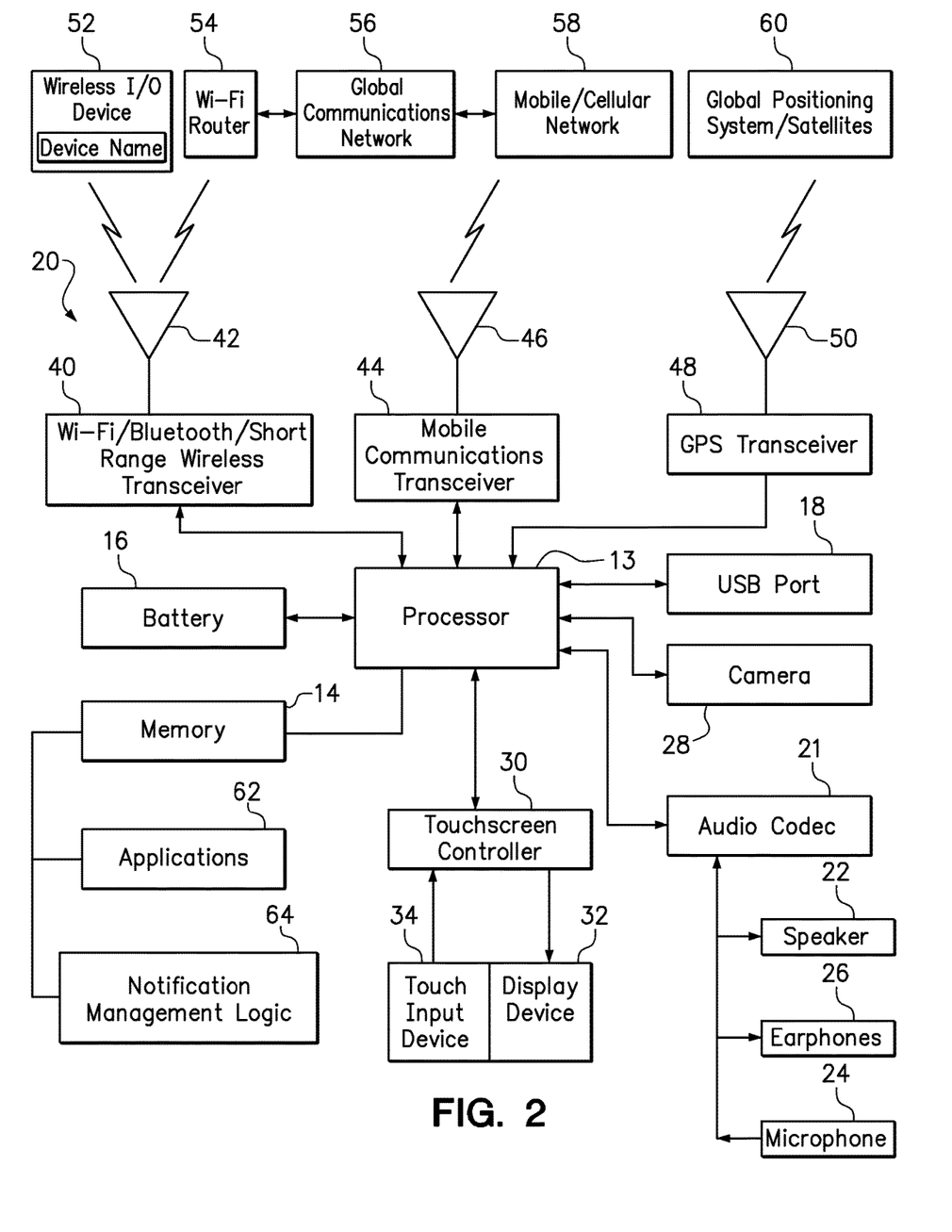
FIG. 2 is a diagram of a mobile communication device suitable for use in one or more embodiments of the present invention.

FIG. 2 is a diagram of the mobile computing device 20, such as a smart phone or tablet computer, capable of implementing embodiments of the present invention. The mobile computing device 20 may be representative of a single mobile computing device suitable for use in embodiments that only require one mobile computing device, or either or both of the first mobile computing device and the second mobile computing device suitable for use in embodiments that involve more than one mobile computing device.

The computing device 20 may include a processor 13, memory 14, a battery 16, a universal serial bus (USB) port 18, a camera 28, and an audio codec 21 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The computing device 20 may also include a Wi-Fi and/or Bluetooth transceiver 40 and corresponding antenna 42 allowing the device to communicate with a wireless (Bluetooth) I/O device 52 (such as a wireless speaker, display or microphone) or a Wi-Fi router 54, a mobile communication transceiver 44 and corresponding antenna 46 allowing the device to communicate over a mobile/cellular network 58

(such as the communication network 11 of FIG. 1), and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. In order to implement one or more embodiment of the present invention, the memory 14 may store one or more applications ("apps") 62 and notification management logic 64.

Figure 3:
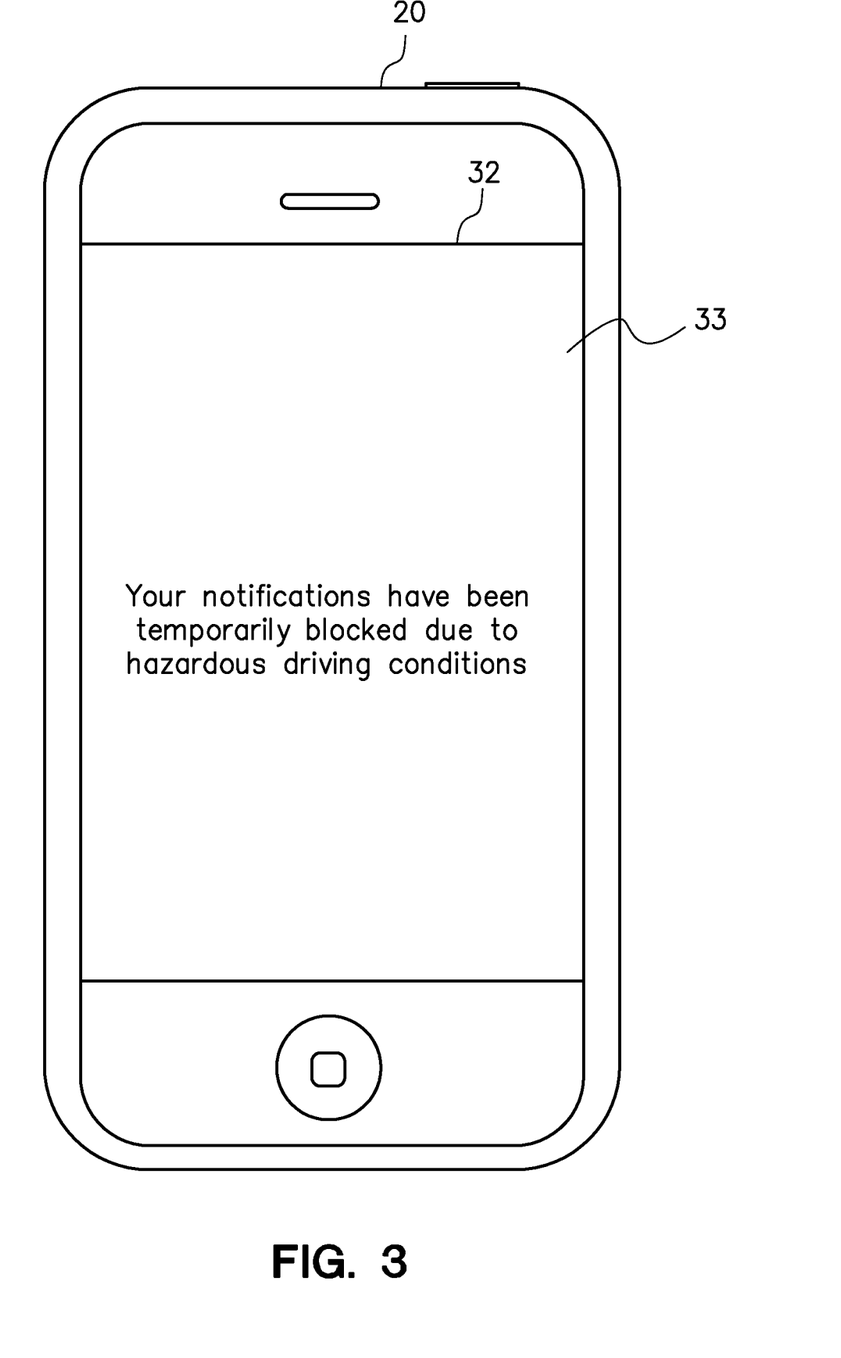
FIG. 3 is a diagram of a mobile computing device including a display screen outputting a message.

FIG. 3 is a screenshot of the display device or screen 32 of the mobile communication device 20 displaying a message 33 informing the user that "Your notifications have been temporarily blocked due to hazardous driving conditions. Preferably such a message neither activates the display screen nor produces any audio output. Rather, the message may be provided in case the user is actively unlocking the mobile communication device to check for notifications.

Figure 4:
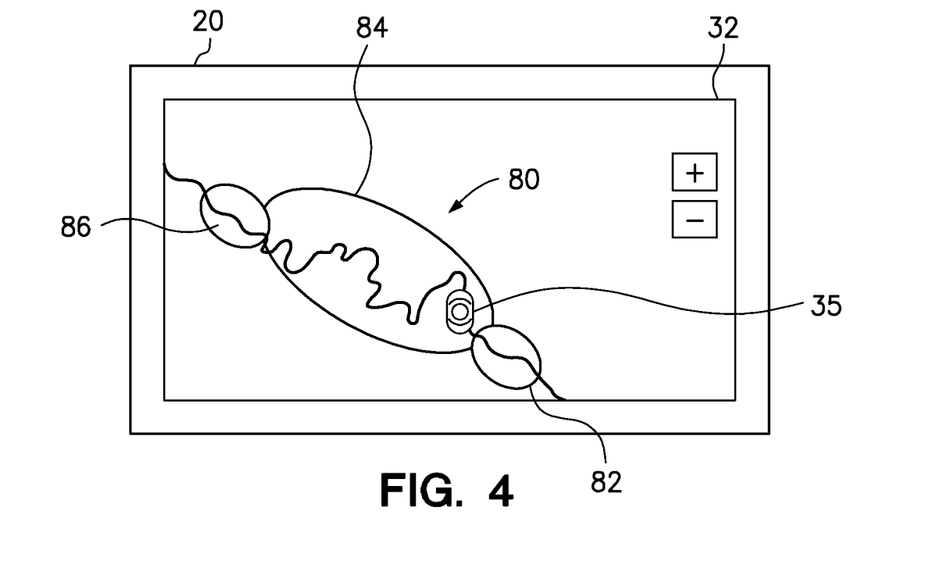
FIG. 4 is a diagram of a mobile computing device including a display screen illustrating a navigation screen.

FIG. 4 is a screenshot of the display device or screen 32 of the mobile communication device 20, perhaps in the form of a vehicle's in-dash screen displaying a map that highlights the roadway that includes the current location (see vehicle icon 35) of the mobile communication device. Alternatively, the display may be that of a smartphone using the map function to navigate the user to a selected destination. Furthermore, the map may include some distinguishing features, such as different colors, to indicate a first portion 82 of the roadway 80 where all notifications are output (i.e., a driving hazard score less than the second threshold value), a second portion 84 of the roadway 80 where all notification are blocked (i.e., a driving hazard score greater than the first threshold value), and a third portion 86 of the roadway 80 wherein only notifications including a high importance flag are output.

Figure 5:
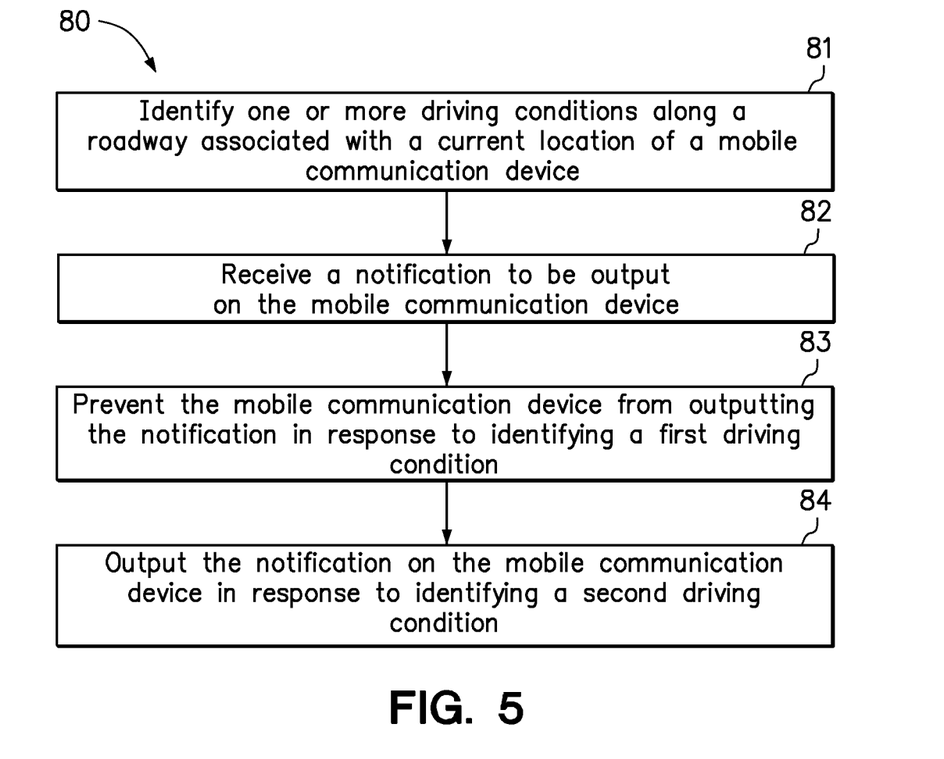
FIG. 5 is a flowchart of a method according to one embodiment of the present invention.

FIG. 5 is a flowchart of a method 80 according to one embodiment of the present invention. In step 81, the method identifies one or more driving conditions along a roadway associated with a current location of a mobile communication device. In step 82, the method receives a notification to be output on the mobile communication device. The method further prevents the mobile communication device from outputting the notification in response to identifying a first driving condition in step 83, and outputs the notification on the mobile communication device in response to identifying a second driving condition in step 84.

Figure 6:
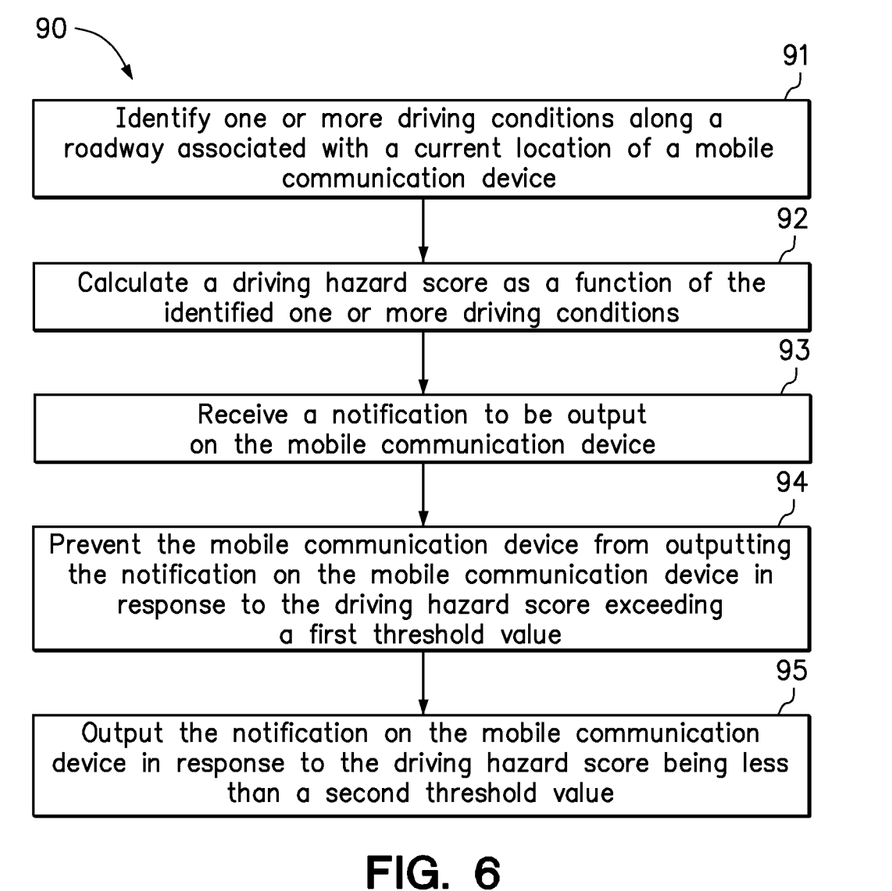
FIG. 6 is a flowchart of a method according to another embodiment of the present invention.

FIG. 6 is a flowchart of a method 90 in accordance with another embodiment of the present invention. In step 91, the method identifies one or more driving conditions along a roadway associated with a current location of a mobile communication device. In step 92, the method calculates a driving hazard score as a function of the identified one or more driving conditions. Step 92 of the method receives a notification to be output on the mobile communication device. The method then, in step 94, prevents the mobile communication device from outputting the notification on the mobile communication device in response to the driving hazard score exceeding a first threshold value. In step 95, the method outputs the notification on the mobile communication device in response to the driving hazard score being less than a second threshold value.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-volatile computer readable medium and non-transitory program instructions embodied therein, the program instructions being configured to be executable by a processor to cause the processor to perform operations comprising:
    identifying one or more driving conditions along a roadway associated with a current location of a mobile communication device, wherein the one or more driving conditions are accessed from at least one source outside the mobile communication device and include at least one driving condition other than a speed of a vehicle;
    receiving a notification to be output on the mobile communication device;
    preventing the mobile communication device from outputting the notification in response to identifying a first driving condition other than a speed of a vehicle; and
    outputting the notification on the mobile communication device in response to identifying a second driving condition other than a speed of a vehicle, wherein the second driving condition is not the same as the first driving condition.

2. The computer program product of claim 1, the operations further comprising:
    storing a list of hazardous driving conditions including the first driving condition;
    wherein preventing the mobile communication device from outputting the notification in response to identifying a first driving condition includes preventing the mobile communication device from outputting the notification in response to identifying any driving condition on the list of hazardous driving conditions; and
    wherein outputting the notification on the mobile communication device in response to identifying a second driving condition includes outputting the notification on the mobile communication device in response to determining that none of the one or more driving conditions are on the list of hazardous driving conditions.

3. The computer program product of claim 1, wherein the one or more driving conditions include at least one driving condition that is independent of operation of the vehicle.

4. The computer program product of claim 1, wherein the notification provides notice of an event selected from an incoming call, an incoming text message, an incoming email, an application state change, a weather alert, and a timer expiration.

5. The computer program product of claim 1, where the notification is related to an incoming message from a sender, the operations further comprising:
    sending an automatic reply message to the sender indicating that notifications have been temporarily blocked.

6. The computer program product of claim 1, wherein identifying one or more driving conditions along a roadway associated with a current location of a mobile communication device, includes identifying the current location of the mobile communication device and accessing map data for a roadway that includes the identified current location of the mobile communication device.

7. The computer program product of claim 6, wherein the map data identifies one or more predetermined driving conditions associated with the roadway, wherein the one or more predetermined driving conditions is selected from a speed limit, a construction zone, merging lanes, roadway curves, roadway straight-ways, stop lights, stop signs, and accident history.

8. The computer program product of claim 6, wherein the map data identifies one or more variable driving conditions associated with the roadway, wherein the one or more variable driving conditions is selected from road hazards and traffic conditions.

9. A computer program product comprising a non-volatile computer readable medium and non-transitory program instructions embodied therein, the program instructions being configured to be executable by a processor to cause the processor to perform operations comprising:
  identifying a plurality of driving conditions along a roadway associated with a current location of a mobile communication device, wherein the identified plurality of driving conditions are accessed from at least one source outside the mobile communication device, and wherein each of the identified plurality of driving conditions are associated with a number of driving hazard points;
  calculating a driving hazard score as a mathematical function of the number of driving hazard points associated with each of the identified plurality of driving conditions;
  receiving a notification to be output on the mobile communication device;
  preventing the mobile communication device from outputting the notification in response to the driving hazard score exceeding a first threshold value; and
  outputting the notification on the mobile communication device in response to the driving hazard score being less than a second threshold value.

10. The computer program product of claim 9, the operations further comprising:
  periodically updating the current location of the mobile communication device; and then
  repeating the steps of identifying a plurality of driving conditions along a roadway associated with the current location of the mobile communication device, and calculating a driving hazard score as a mathematical function of the identified plurality of driving conditions.

11. A computer program product comprising a non-volatile computer readable medium and non-transitory program instructions embodied therein, the program instructions being configured to be executable by a processor to cause the processor to perform operations comprising:
  identifying one or more driving conditions along a roadway associated with a current location of a mobile communication device, wherein the one or more driving conditions are accessed from at least one source outside the mobile communication device;
  calculating a driving hazard score as a function of the one or more driving conditions;
  identifying a driving experience level associated with the user of the mobile communication device;
  selecting a first threshold value as a function of the identified driving experience level;
  receiving a notification to be output on the mobile communication device;
  preventing the mobile communication device from outputting the notification in response to the driving hazard score exceeding the first threshold value; and
  outputting the notification on the mobile communication device in response to the driving hazard score being less than a second threshold value.

12. The computer program product of claim 11, wherein the driving experience level is positively correlated to the number of times that the mobile communication device has been at the current location of the identified roadway.

13. The computer program product of claim 9, wherein the notification is received during a period that the driving hazard score exceeds the first threshold and is prevented from being output on the mobile communication device delaying output of the notification until the driving hazard score is less than the second threshold value.

14. The computer program product of claim 9, the operations further comprising:
  receiving a notification having a high importance flag; and
  outputting the notification having the high importance flag regardless of whether the driving hazard score exceeds the first threshold value.

15. The computer program product of claim 9, the operations further comprising:
  automatically selecting an output device of the mobile communication device based on the driving hazard score, wherein the output device is selected from a display screen, a speaker, and a vibrator.

16. The computer program product of claim 15, wherein automatically selecting an output device of the mobile communication device based on the driving hazard score includes automatically selecting a speaker as the output device in response to the driving hazard score exceeding the first threshold value.

17. The computer program product of claim 9, the operations further comprising:
  in response to the driving hazard score exceeding the first threshold value, outputting a message on the mobile communication device indicating that notifications are currently being prevented.

18. The computer program product of claim 9, the operations further comprising:
  identifying an planned route of the mobile communication device;
  calculating a driving hazard score as a function of the identified one or more driving conditions at multiple points along the planned route;
  estimating a period of time or a distance of travel after which notifications will no longer be prevented; and
  outputting the estimated period of time or distance of travel.

19. The computer program product of claim 18, wherein outputting the estimated period of time or distance of travel includes displaying a map indicating at least a portion of a roadway where notifications will be prevented.

* * * * *